United States Patent [19]
Gregory, III et al.

[11] Patent Number: 5,793,415
[45] Date of Patent: Aug. 11, 1998

[54] VIDEOCONFERENCING AND MULTIMEDIA SYSTEM

[75] Inventors: Earl A. Gregory, III; R. Dean Heibert; Thomas A. Niemann; Mark Fauth; Bradford Janssen; Gregory Stinson; Aleksandr Shkiler; Hal Perdew, all of Louisville, Ky.

[73] Assignee: ImageTel International Inc., Louisville, Ky.

[21] Appl. No.: 440,966

[22] Filed: May 15, 1995

[51] Int. Cl.$^6$ .................................... H04N 7/14
[52] U.S. Cl. ............................ 348/15; 381/123; 381/77
[58] Field of Search ....................... 370/62, 260, 265, 370/266, 270; 348/7, 15, 16, 14; 379/202, 96, 203, 204; 381/80, 81, 119, 122; 364/514 A; 395/200.04

[56] References Cited

U.S. PATENT DOCUMENTS

| | | | |
|---|---|---|---|
| 4,281,410 | 7/1981 | Aegricela et al. | 370/110 |
| 4,529,840 | 7/1985 | Colton et al. | 348/15 |
| 4,716,585 | 12/1987 | Tompkins et al. | 179/18 BC |
| 4,845,749 | 7/1989 | Brickell et al. | 380/46 |
| 4,882,747 | 11/1989 | Williams | 379/102 |
| 4,890,314 | 12/1989 | Judd et al. | 379/53 |
| 4,928,301 | 5/1990 | Smoot | 379/53 |
| 4,961,211 | 10/1990 | Tsugane et al. | 379/202 |
| 5,038,224 | 8/1991 | Martulli et al. | 358/446 |
| 5,061,992 | 10/1991 | Veno | 379/53 |
| 5,115,230 | 5/1992 | Smoot | 340/707 |
| 5,117,285 | 5/1992 | Nelson et al. | 358/85 |
| 5,187,571 | 2/1993 | Braun et al. | 358/85 |
| 5,271,057 | 12/1993 | Addeo et al. | 379/202 |
| 5,280,540 | 1/1994 | Addeo et al. | 379/54 |
| 5,283,638 | 2/1994 | Engberg et al. | 348/14 |
| 5,303,042 | 4/1994 | Lewis et al. | 348/14 |
| 5,315,633 | 5/1994 | Champa | 348/16 |
| 5,323,445 | 6/1994 | Nakatsuka | 348/15 |
| 5,335,011 | 8/1994 | Addeo et al. | 348/15 |
| 5,335,022 | 8/1994 | Braun et al. | 348/744 |
| 5,371,534 | 12/1994 | Dagdeviren et al. | 348/14 |
| 5,374,952 | 12/1994 | Flake | 358/83 |
| 5,386,465 | 1/1995 | Addeo et al. | 379/202 |
| 5,389,963 | 2/1995 | Lepley et al. | 348/7 |
| 5,483,588 | 1/1996 | Eaton et al. | 379/202 |
| 5,526,037 | 6/1996 | Cortjens et al. | 348/15 |
| 5,528,289 | 6/1996 | Cortjens et al. | 348/211 |
| 5,534,914 | 7/1996 | Flohr et al. | 348/15 |
| 5,535,281 | 7/1996 | Gulick | 381/122 |
| 5,568,183 | 10/1996 | Cortjens et al. | 348/15 |

FOREIGN PATENT DOCUMENTS

| | | |
|---|---|---|
| 0535890 | 9/1992 | European Pat. Off. . |
| 9424804 | 10/1994 | WIPO ................ H04M 11/00 |

OTHER PUBLICATIONS

PictureTel Live (TM) PCS 100, brochure, Mar. 10, 1995.

Primary Examiner—Curtis Kuntz
Assistant Examiner—Stephen W. Palan
Attorney, Agent, or Firm—Roylance,Abrams,Berdo & Goodman, L.L.P.

[57] ABSTRACT

A videoconferencing system is provided which comprises a personal computer having a 32-bit multi-tasking, native-networking operating system and a touch screen graphic user interface for controlling the system. The videoconferencing system is configured for the integration of applications programs, the transfer of data outside the bandwidth of a videoconference and remote diagnostics. Circuits for pooling CODECs and bridging audio signals are also provided.

4 Claims, 13 Drawing Sheets

VIDEOCONFERENCING AND MULTIMEDIA SYSTEM

FIELD OF THE INVENTION

The invention relates to a videoconferencing and multimedia system for bi-directional transmission of voice, image data and other data among geographically distributed users.

BACKGROUND OF THE INVENTION

The development of two-way videoconferencing systems has provided individuals, who are geographically distributed, with the ability to communicate with each other from their respective locations. Thus, the time and expense of several individuals traveling to a single location in order to meet in person is eliminated. The ability to communicate graphic information, as well as see the facial expressions and gestures of conferees, presents significant improvements over audio telecommunication. A number of video telephones have been developed which interface with analog telephone lines. Due to the limited bandwidth of conventional analog telephone lines, however, the amount of information that can be exchanged is limited to less than full motion video and is typically presented on a relatively small display.

To overcome bandwidth limitations associated with video telephony transmitted over analog telephone lines, a number of videoconferencing systems have been developed to interface with digital telephone access lines such as an integrated services digital network (ISDN). The increased bandwidth associated with digital access systems has allowed for nearly full motion videoconferencing on larger display devices; however, many of these digital videoconferencing systems continue to transmit video information as "jerky motion" and not smooth video. Further, the audio system associated with many of these devices is not a two-way system, that is, a conferee is interrupted and his or her voice is no longer audible if another conferee speaks simultaneously.

Thus, a need remains for improvement of a videoconferencing system to allow for smooth video and bidirectional audio. Further, a need exists for improved integration of the videoconferencing system with multimedia devices for sending, for example, graphic information, as well as audio and video data over a digital network.

SUMMARY OF THE INVENTION

In accordance with an aspect of the present invention, a videoconferencing system is provided which comprises a personal computer having a multi-tasking, native-networking operating system and a touch screen graphic user interface for controlling the system.

In accordance with another aspect of the present invention, the videoconferencing system is configured for integration with applications programs, the transfer of data outside the bandwidth of a videoconference and remote diagnostics.

In accordance with yet another aspect of the present invention, a circuit is provided for pooling CODECs and bridging audio signals between a number of local videoconference sites.

In accordance with an embodiment of the invention, a system for establishing a videoconference between a local videoconference site and a remote videoconference site comprises a display device at the local videoconference site; an encoder and decoder circuit connected to the display device; at least one camera, at least one microphone and at least one speaker at the local videoconference site, the camera and the microphone being operable to generate, respectively, local video signals and local audio signals relating to the local videoconference site and providing the local video signals and the local audio signals to the encoder and decoder circuit; transmission means connected to the encoder and decoder circuit for processing and transmitting the local video signals and the local audio signals to the remote videoconference site, the encoder and decoder circuit being operable to format remote video signals and remote audio signals generated by the remote videoconference site into a format suitable for the display device; a touch screen; and a multi-tasking, native-networking processor circuit connected to the display device and the touch screen.

BRIEF DESCRIPTION OF THE DRAWINGS

These and other features and advantages of the present invention will be more readily apprehended from the following detailed description when read in connection with the appended drawings, which form a part of this original disclosure, and wherein.

DETAILED DESCRIPTION OF THE PREFERRED EMBODIMENTS

Overview

Figure 1:
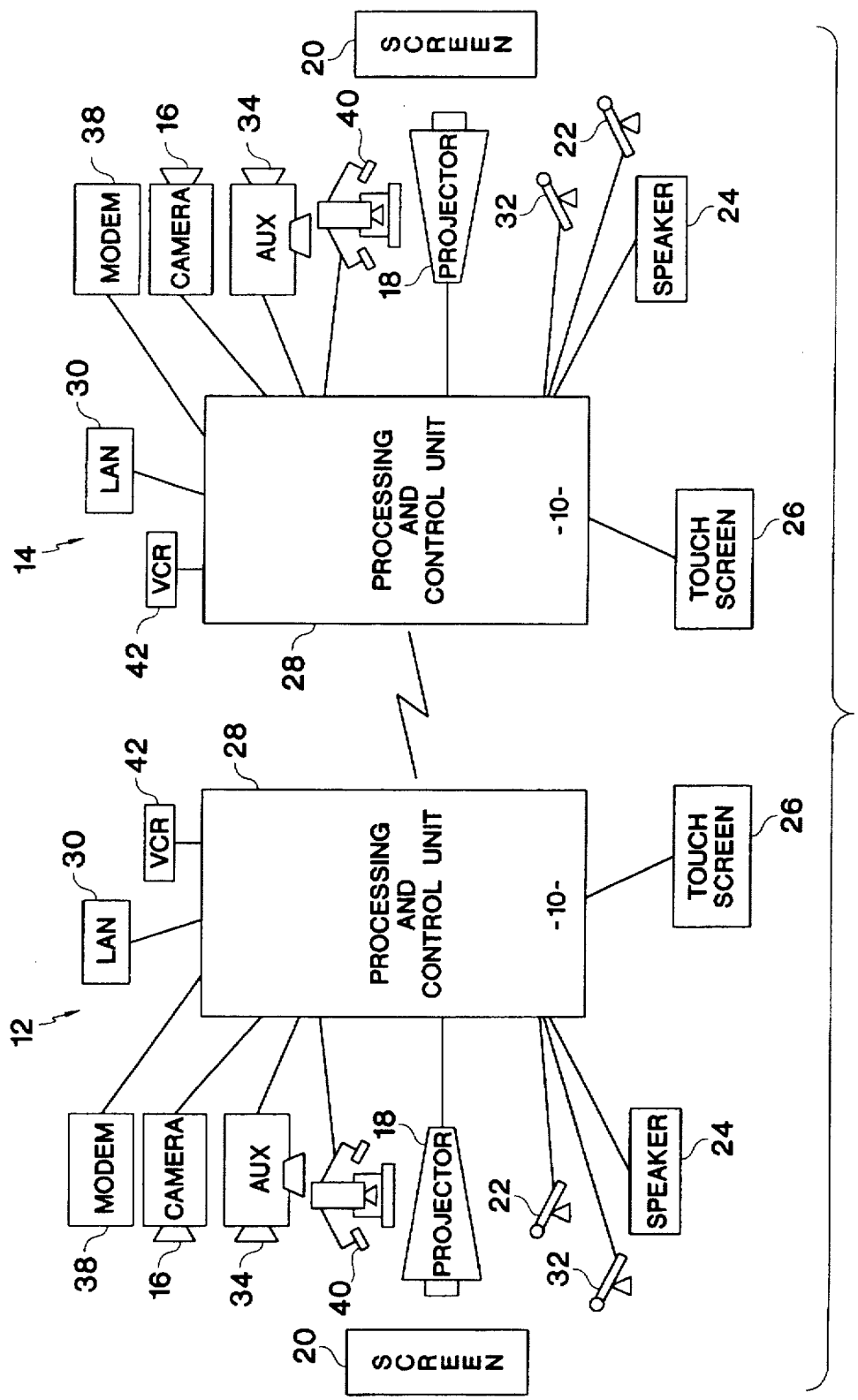
FIG. 1 depicts two videoconferencing systems constructed in accordance with an embodiment of the present invention and located at local and remote videoconference sites, respectively.

FIG. 1 depicts a videoconferencing system 10 located at local videoconference site 12 and constructed in accordance with the present invention, which is in communication with at least one other videoconferencing system 10 located at a remote videoconference site 14. As will be described in further detail below, each videoconferencing system 10 comprises a camera 16, a projector 18 and screen 20, at least one microphone 22, at least one speaker 24, a user interface 26 such as a touch screen and a control unit 28. The control unit controls these devices and processes audio, video and other data that is received from a remote videoconference site or is about to be transmitted thereto. Each system 10 can also comprise a network interface 30 to, for example, a local area network (LAN), at least one auxiliary audio source 32, at least one auxiliary video source 34, a facsimile modem 38, and other multimedia devices such as a graphic image display 40 or a video cassette recorder (VCR) 42.

Figure 2:
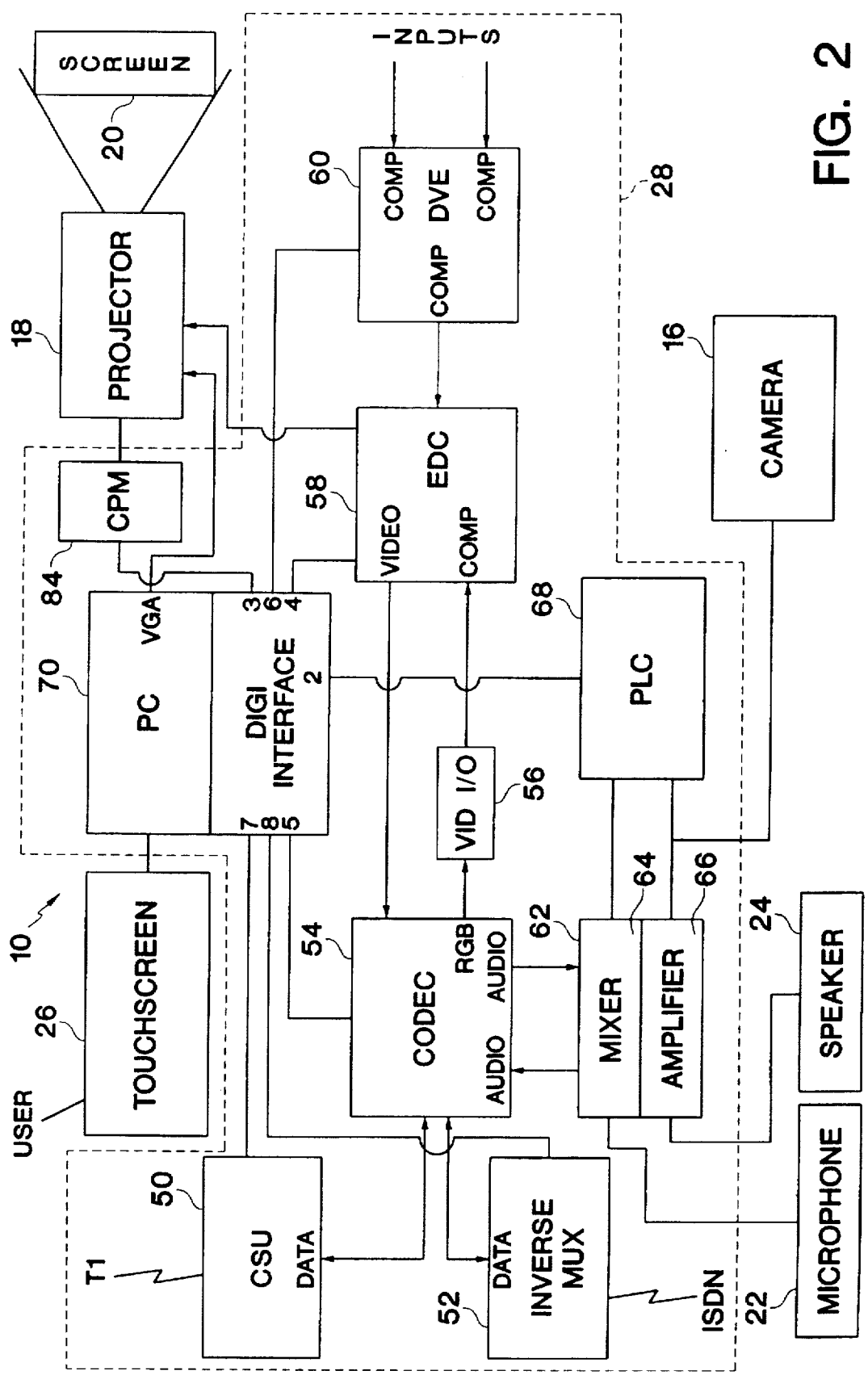
FIG. 2 is a schematic block diagram of the videoconferencing system depicted in FIG. 1.

FIG. 2 depicts a first embodiment of the videoconferencing system 10 of the present invention which employs a large screen 20, e.g., a seven foot by four foot screen, and is built to be a stationary system in a room designated for multiple person videoconferences.

Figure 3:
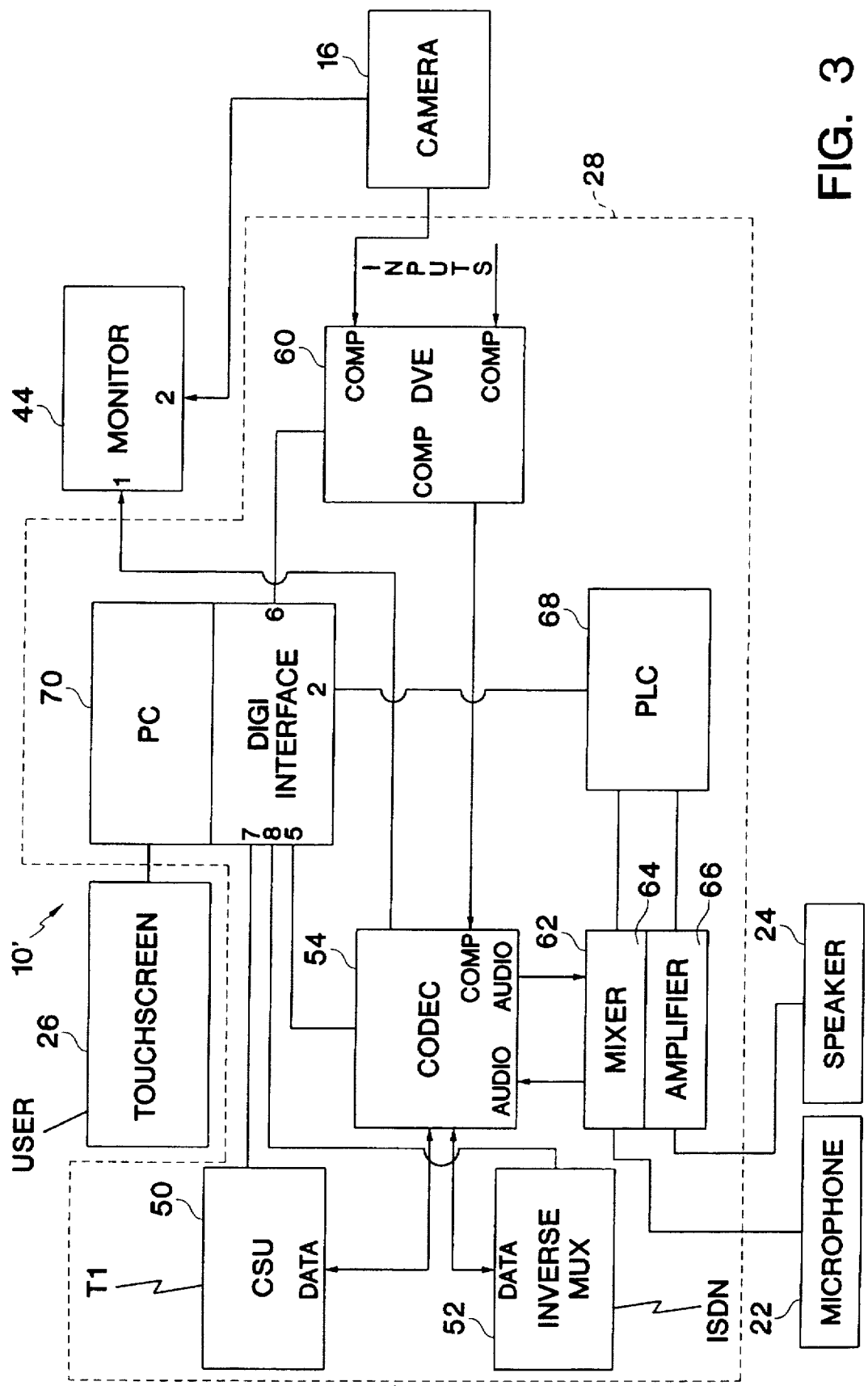
FIG. 3 is a schematic block diagram of a videoconferencing system constructed in accordance with another embodiment of the present invention.

FIG. 3 depicts a second embodiment of the videoconferencing system 10' of the present invention which employs a portable, roll-around cabinet having a wide-screen 36 inch monitor 44. This embodiment of the present invention is useful for conferees desiring the flexibility of using different rooms for videoconferencing, or who do not wish to dedicate an entire room for videoconferencing.

With reference to FIG. 2, the system 10 is connected to a telecommunications network such as a T1 network or an ISDN by a Channel Service Unit (CSU) 50 or an Inverse Multiplexer (IMUX) 52, respectively. The CSU 50 is preferably a model MB+1CSU-2PT1/PRI unit manufactured by Ascend Communications, Alameda, Calif. for interfacing with a PRI or T1 network. A model number MB+8PRI IMUX 52 manufactured by Ascend Communications is preferably used to interface with an ISDN.

Data received from the CSU 50 or IMUX 52 is provided to a coder/decoder (CODEC) 54. The CODEC decodes data received from a remote videoconference site 14 via the T1 or ISDN network. A model BT VC2300 CODEC manufactured by British Telecom, Reston, Va., is preferably used. The CODEC 54 also encodes audio and video data generated by the system 10 for transmission across a network to the remote videoconference site. Video data from the remote videoconference site 14 is provided to the projector 18 via a video input/output (VID I/O) transcoder unit 56 and a YEM Scan Doubler or enhanced definition encoder (EDC) 58. The EDC is preferably a model EDC2000 manufactured by Yamashita Engineering Manufacture, Inc., Kanagawa, Japan. The transcoder 56 is preferably a model VID I/O manufactured by TrueVision, Indianapolis, Ind. The VID I/O unit 56 transcodes video to a composite format (Y/C) from an RGB format in order to be supplied to the EDC 58. The EDC scan doubler enhances the video prior to projection. As will be discussed in further detail below, the EDC 58 provides a full-screen preview of what is being transmitted to the remote videoconference site. The projector is preferably a model ECP3101 ACON projector available from Electrohome, Columbus, Ohio. This type of projector 18 is advantageous because it has advanced functionality such as ACON or automatic convergence, as well as computer control capability. The YEM scan doubler 58 receives composite video from the camera 16 (e.g., a model GP-US502 3CCD camera from Panasonic Broadcast and Television, Elgin, Ill.) via a digital video effects (DVE) module 60. The screen 20 used with projector 18 is preferably a single-layer, high gain, Fresnel-Lenticular-type screen. For example, a seven foot by four foot Diamond Screen, available from Draper Screen Company, Spiceland, Ind. can be used.

Audio signals received from the remote videoconference site 14 are processed by the CODEC 54 and output to an audio mixer/amplifier unit 62. The audio mixer/amplifier unit 62 preferably comprises a model 4800-series mixer 64 manufactured by Innovative Electronic Design (IED), Louisville, Ky., which mixes inputs from as many as 8 microphones into one signal. The audio mixer/amplifier unit 62 also comprises an IED model 5000-Series Amplifier chassis 66 which holds cards for performing amplification and mixing, as well as echo cancellation. The audio mixer/amplifier unit 62 receives audio signals from the camera 16 and provides them to the CODEC 54 for transmission to the remote videoconference site 14. The audio system of the present invention preferably uses JBL Control 1 speakers 24 and models numbers PCC-160 and PCC-160W Phase Coherent Cardioid, Crown microphones 22, both of which are available from Communications System Group, Covington, Ky. The audio system is provided with between one and four microphones, although more can be used.

With continued reference to FIG. 2, the system 10 comprises a PLC chassis 68 (e.g., model number LittlePLC manufactured by Zworld Engineering, Davis, Calif.) which encloses cards for controlling audio system volume and black and white balance functions of the camera, as well as other voltage controlled devices via a management system described below. These functions are performed by a personal computer (PC) 70 via the PLC 68. The PC 70 is connected to a touch screen or other user interface 26 and to the projector 18. The system 10 is configured to have a 16×9 aspect ratio and to provide full motion video at approximately 30 frames per second at all times. A management software control system is provided in the PC to perform such functions as providing via a picture-in-picture (PIP) display a preview of the local conference room scene can be transmitted, master input and output audio control, control of at least one external video source, simplified dialing for commencing communication with the remote videoconference site, automatic convergence, and switching between 16×9 and 4×3 video aspect ratios. The flat touch screen interfaces with the management system to receive user input. The system 10 can control external audio sources and video sources and perform switching among them.

The alternate embodiment of the invention, that is system 10' depicted in FIG. 3, has a number of identical components such as the CSU 50, the IMUX 52, the CODEC 54, the audio mixer/amplifier unit 62, the touch screen 26, the PC 70, the PLC 68, and camera 16 interfaced with the CODEC 54 via a DVE 60. The roll-around model of system 10' comprises a monitor such as a PROSCAN 36 inch HDTV-formatted monitor 44 available from Thompson Consumer Electronics, Indianapolis, Ind. The monitor 44 provides the projection and speaker systems for the roll-around embodiment of the system 10'.

As with the first embodiment of the system 10, the system 10' has a 16×9 aspect ratio and full motion video attempting 30 frames per second at all times. The management software control system for the videoconferencing system 10' also allows for control of at least one external video source and for simplified dialing to commence telecommunication with the remote conference site. The system 10' allows for master input audio control. The system 10' provides for remote control of a number of functions such as PIP preview, television volume control, full screen preview, and aspect ratio switching.

Figure 4:
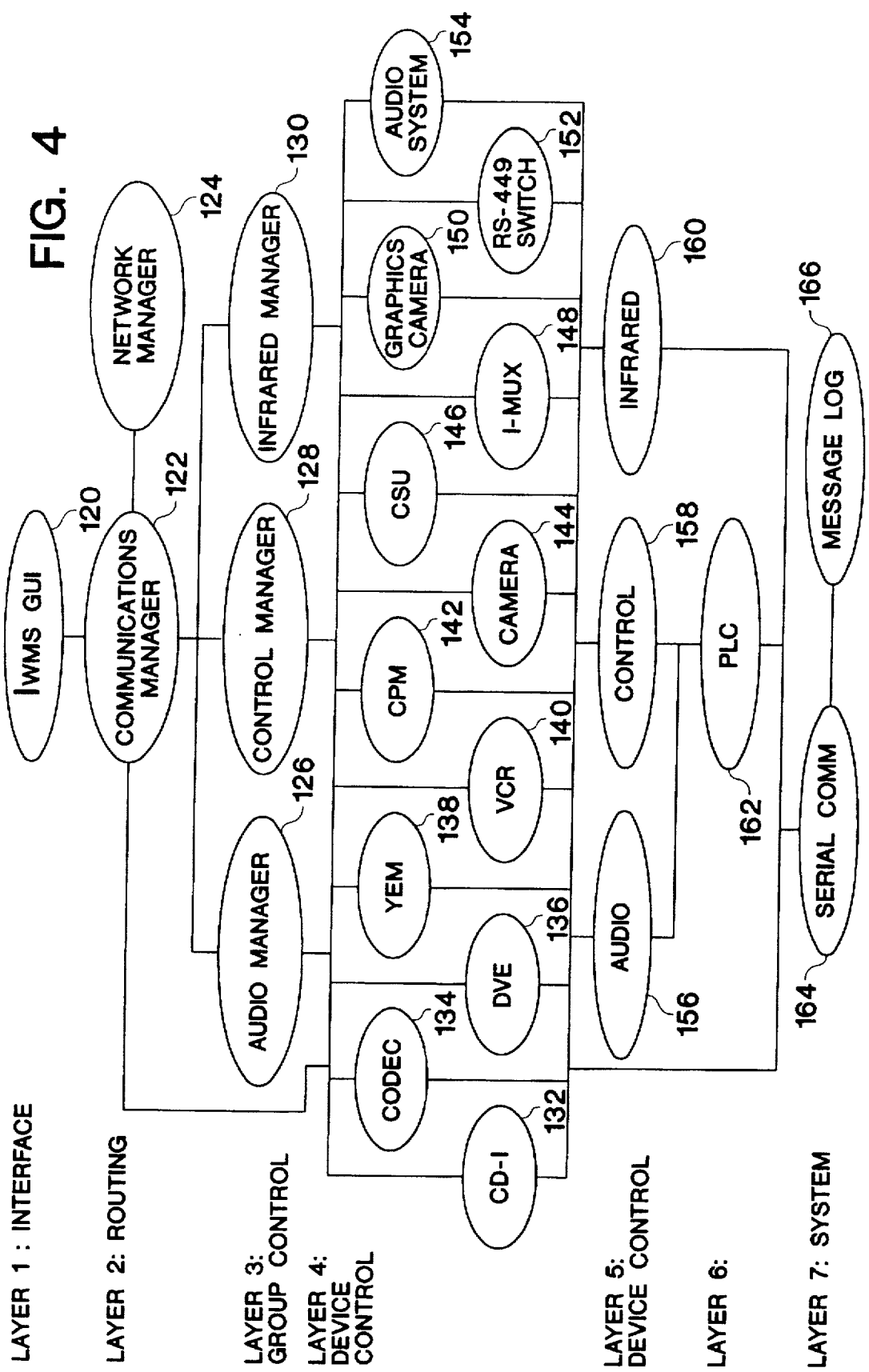
FIG. 4 is a diagram of a management software control system for a videoconferencing system in accordance with the present invention.

The software control or management system for both the videoconferencing system 10 and system 10' will be discussed in connection with FIG. 4. The management system is a collection of software applications which provide a user-friendly interface to conferees and other users so that they can control and manage the videoconferencing system 10 or 10'. Although the system is independent of whatever operating system it is run on, the management system is preferably used in connection with a Windows NT platform. UNIX and OS/2 operating systems can also be used. For program coding purposes, the management system is modeled as several separate layers, with each layer being responsible for its particular level of functionality within the management system. In addition to being modeled in a layered manner, the management system is designed using an object oriented-type approach wherein each layer in the model has several different objects. An object can represent a collection of methods used to control and manage a particular device such as the CODEC, a collection of devices such as the video components of the system 10, or a conceptual management model. The management system is designed to be quickly adapted to accommodate new devices added to the system 10 or 10', to comply with new international standards regarding, for example, telecommunications and high definition television, as well as to provide a software system that is relatively easily maintained.

An infrared (IR) interface can be provided in the system 10' to allow for software control of IR-controllable components, such as the monitor 44 and peripheral devices such as a VCR.

Communications

The communications devices and functions in videoconferencing system 10 and 10' are essentially identical. The following discussion therefor will be with reference to the system 10, with the understanding that it also pertains to system 10'. The system 10 is configured to interface with T1 or ISDN conferencing links. The CODEC 54 encodes input video and audio data and sends the data to either the CSU 50 or IMUX 52, where the data is multiplexed into a form suitable for transmission. The CODEC 54 performs the reverse process on a signal received from the remote conferencing site 14. For backup communications, the high speed modem 38 can be used for maintaining control signaling for diagnostic purposes.

The CODEC 54 provides ITU-T compliant standards-based transmission of audio and video at T1/E1 and fractional T1/E1 rates. High speed data transfer to and from the CODEC is available via an RS-449 interface. An interface to a T1 network and a dual X.21/V.35 interface are also provided on the CODEC. The CODEC processes audio and video in conformance with ITU-T H.320 suite of standards for videoconferencing systems. The CODEC allows the user to select the data rate from among increments of data rates of 56 or 64 kilobits per second, where the increments are integer values between 1 and 30.

The CODEC 54 performs video coding at both QCIF and full CIF resolutions. Compression performed by the CODEC 16 meets ITU-T recommendation H.261 implementing both inter-frame and intra-frame standard coding techniques, together with discrete cosine transforms (DCT). Enhanced picture performance is also provided by the CODEC using motion compensation techniques. The resolution quality of the CODEC 54 meets ITU-T H.261 for both picture format CIF and QCIF. The CODEC can be configured to conform with CCIR 471/472 or RS-170A standards by generating PAL 625 lines per frame interlaced at 50 fields per second or NTSC 525 lines per frame interlaced at 60 fields per second, respectively. The CODEC 54 preferably has as many as five composite video inputs and one RGB input, and three RGB/composite video outputs.

The CODEC 54 is configured to operate in a number of audio coding modes by adding a daughter board to the main audio mother board in the CODEC 54. The audio coding modes can include, for example, enhanced wideband audio at 56/48 kilobits per second coded to Adaptive Differential Pulse Code Modulation (ADPCM) conforming to ITU-T G.722 standard, A-Law/μ-Law audio conforming to ITU-T G.711 and narrow band at 16 kilobits per second. The CODEC can be remotely accessed via RS-232C port which is programmable for data rates between 75 bits per second and 19.2 kilobits per second for diagnostics, maintenance and control purposes.

The IMUX provides D-channel signalling and operates with a 1.544 megabits per second digital channel using RJ-48 jacks. The IMUX connects the system 10 or 10' to the ISDN using eight pin modular plugs. The system 10 or 10' preferably uses three or six of these plugs to interface with three or six ISDN lines. Thus, a conference call can be established at a rate of 384 kilobits per second or at a higher rate of 768 kilobits per second, or a fraction of either 384 kilobits per second or 768 kilobits per second in 56 or 64 kilobit per second increments. The speed at which the communications for a video conference is selected as described in further detail below in connection with the Communications Options screen (FIG. 16) of the graphic user interface 26.

Video System

Figure 5:
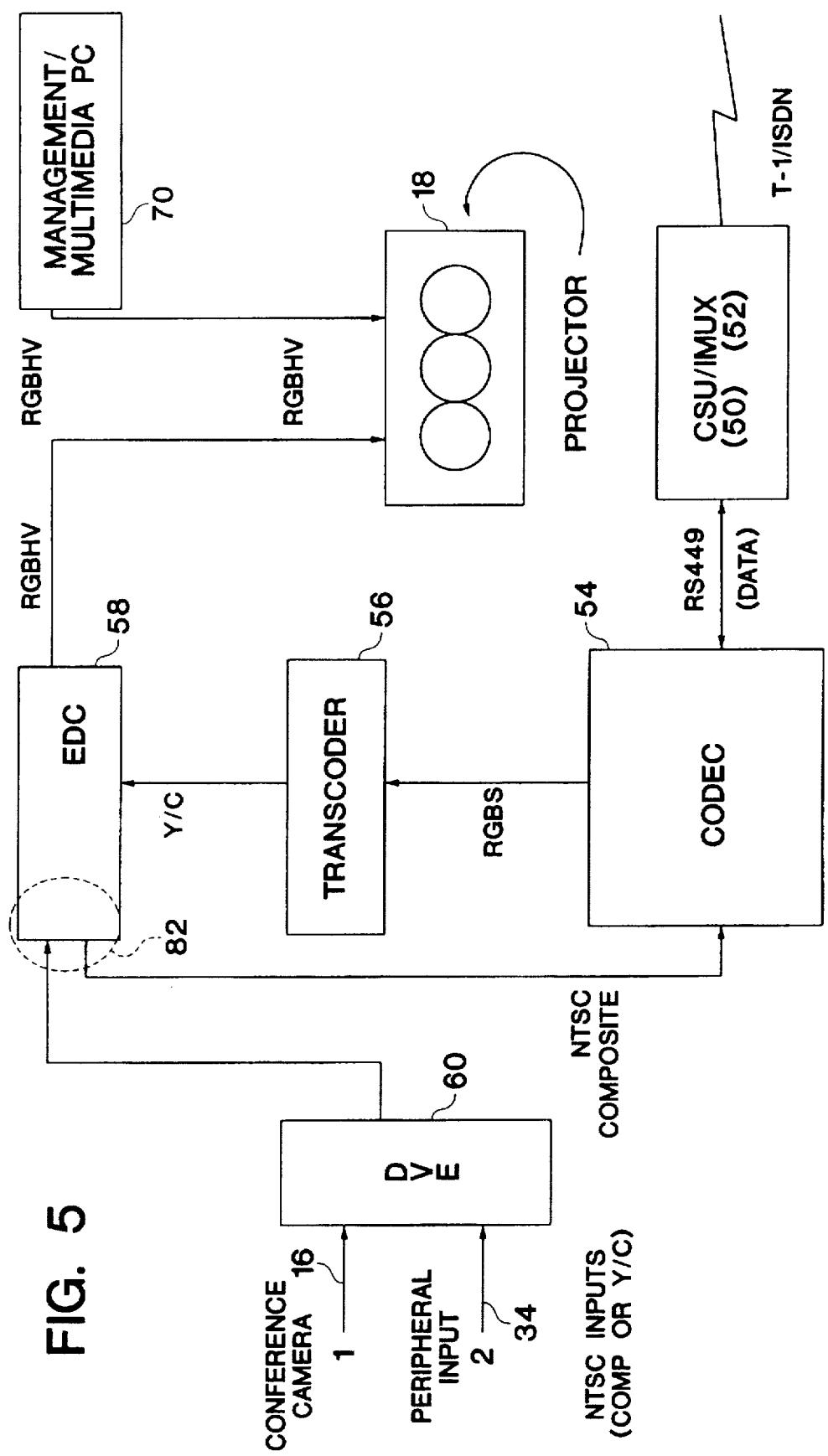
FIG. 5 is a schematic block diagram of the video components of the videoconferencing system depicted in FIG. 2.

FIG. 5 depicts the video of the videoconferencing system 10. In addition to the conference camera 16, the system 10 can include one or more peripheral input devices 34 such as another camera, a laser disc player, a VCR, a computer and a slide projector. The inputs can be either composite or Y/C formatted and are provided to the EDC 58 for full screen preview. A loop-through output from the composite input to the EDC 58 is then sent to the CODEC 54 for encoding. The management/multimedia PC 70 is programmed to control the output from the EDC to the projector 18. Thus, the projector can provide a preview of the local videoconference site 12 or the remote conference site 14.

Figure 6:
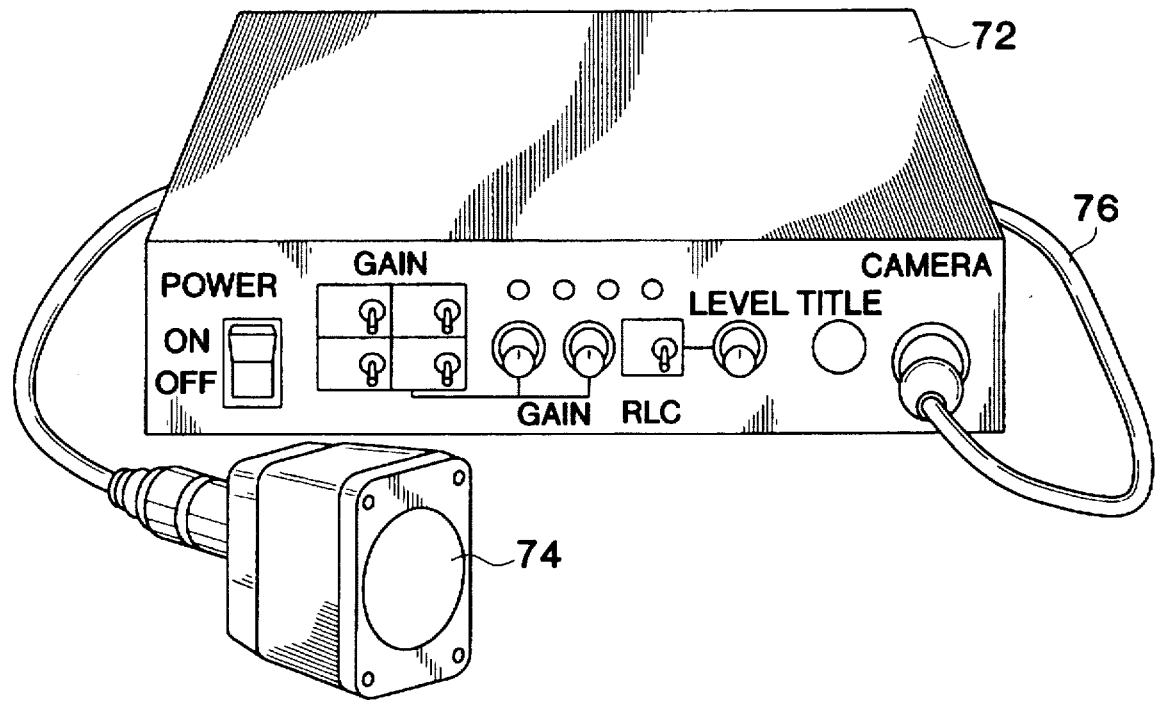
FIG. 6 is an isometric view of a camera control unit and camera head for a videoconferencing system constructed in accordance with the present invention.

The camera 16 comprises a video camera control unit 72 and a 3-CCD remote color video camera head 74 connected thereto, as shown in FIG. 6. A Hirosu 20 pin to special 21 pin cable 76 connects the remote camera head 74 to the camera control unit 72. The control unit 72 comprises an S-video output, a D-sub 9-pin output for RGB formatted video and two composite video outputs. The control unit provides a range of digital signal processing (DSP) functions, e.g., selectable auto-tracing white balance (ATW), auto white balance control (AWC) and manual white balance control (R GAINB\GAIN). Further, an auto black balance function is provided, along with a manual R and B pedestal control. The PC 70 is programmed to allow the user to adjust black and white camera balance, as will be described below in connection with the graphic user interface screens.

Figure 7:
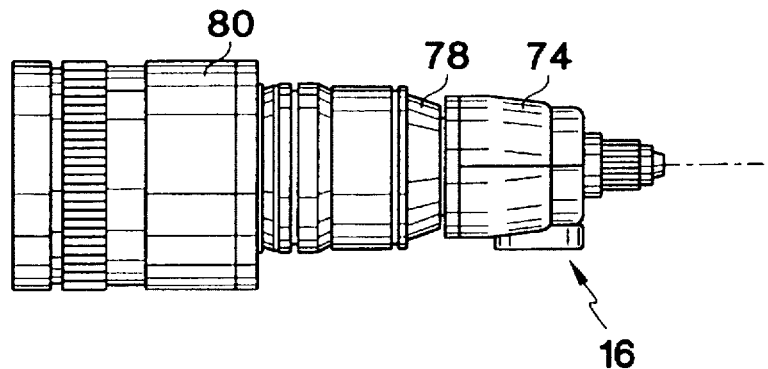
FIG. 7 is a side view of the camera head depicted in FIG. 6.

The camera lens comprises a 9 millimeter focal length spherical element 78 and a 1.5 magnification cylindrical element 80, as shown in FIG. 7. This composite lens structure provides a means for utilizing the advantages of 16×9 imaging using standard 4×3 imaging techniques. Due to the smaller horizontal distance traveled by an object in motion when viewed through this composite lens (versus a standard spherical 4×3 lens), this structure has the added advantage of providing a reduced-motion component in the horizontal domain. As motion is generally greatest in the horizontal domain, this has the unique advantage of further improving the video compression and encoding provided by the CODEC 54.

The camera is preferably mounted at the bottom of the screen 20 in system 10 and at the bottom of the monitor 44 in system 10', and is centered in each case to allow for improved eye contact between conferees during a videoconference. Further, such video camera placement and the above described lens provides the appearance of an extended meeting table during a videoconference, that is, conferees at the remote videoconference site appear to be sitting at the end of the table at which the local conferees are sitting.

The transcoder 56 converts analog RGB into both composite video and S-video (Y/C), as well as converts composite video and S-video to analog RGB. The transcoder accepts both NTSC and PAL formatted video, as well as generates both NTSC and PAL outputs. A PIP function is available for either incoming or outgoing pictures via the DVE module 60. PIPs are selectable in size and position on the monitor or screen. The DVE module 60 can comprise a video switch card (4 inputs switch to 1 output) and a time-based corrector frame synchronizer card manufactured by NOVA Systems, Canton, Conn., if a PIP transmission is not necessary. Alternatively, the DVE module 60 can be a Hotronics model AQ21SP. The DVE module 60 provides a composite output signal to the EDC 58.

The EDC converts standard composite video and S-video into non-interlaced RGB picture signals which are provided to the projector 18. The EDC 58 comprises a composite loop through input 82, as shown in FIG. 5, which permits an input from the DVE module 60 to be supplied to the projector 18 to allow a full screen preview of the local videoconference site 12 before it is transmitted to the remote videoconference site 14. The monitor 44 has two inputs connected to the CODEC and to the camera and can switch therebetween to show far side and near side images, respectively.

The projector 18 is preferably a rear screen-type projection system, although a front screen-type projection system can be used. The projector is connected to a projector communications processor module (CPM) 84, which provides remote projection control via the personal computer 70. The projector 18 can provide high-resolution graphic data from an external computer. Switching between projector sources is provided via the CPM 84.

Audio System

Figure 8:
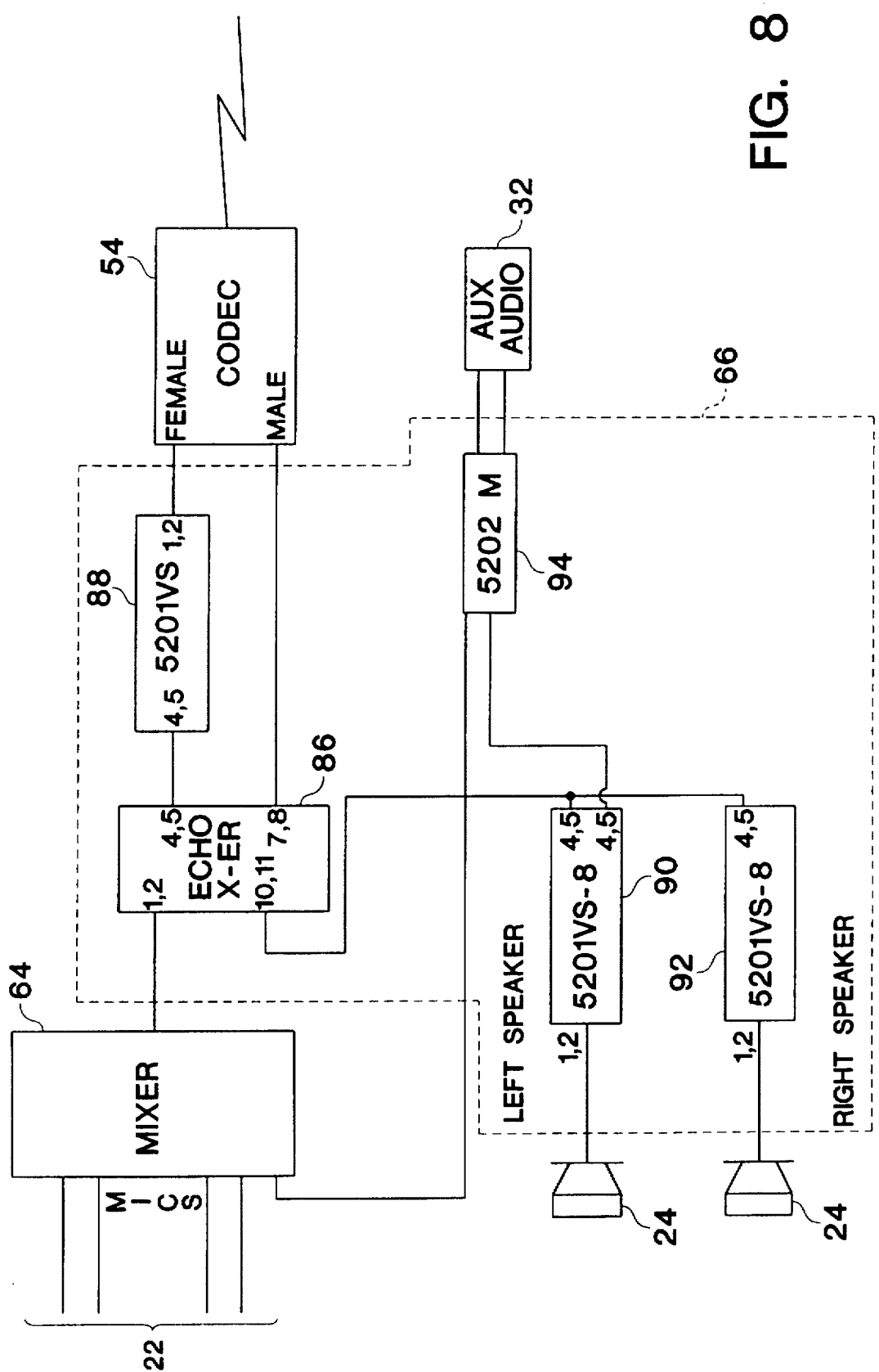
FIG. 8 is a schematic block diagram of an audio system for accommodating an external audio source in a videoconferencing system constructed in accordance with the present invention.

As stated previously, in connection with FIGS. 2 and 3, the systems 10 and 10' comprise an audio mixer/amplifier unit 62. Further, the audio mixer/amplifier unit 62 comprises a mixer 64 for receiving a number of microphone inputs, and an amplifier chassis 66 in which a number of audio cards are mounted. With reference to FIG. 8, the mixer 64 provides microphone output signals to an echo canceler card 86 and then to an audio card 88 (e.g., an IED 5201VS card) configured to receive two audio input signals and to generate a single audio output signal. Alternatively, the audio system can be configured without an echo canceler card. For example, echo cancellation can be performed in another part of the system 10 or 10' such as in the CODEC 54. The audio card 88 provides volume control, as well as switching to engage and disengage a mute function. Signals from the mixer 64 are provided to two audio cards 90 and 92 (e.g., IED 5201VA-8 cards), which are connected to left and right speakers 24, respectively.

In accordance with one embodiment of the invention, an audio card 94, (e.g., an IED 5202M audio card), which has two inputs and two outputs for stereo audio signals and a mono output can be connected to an audio peripheral device 32 for receiving stereo audio signals therefrom. The left and right output signals from the card 94 are provided to the audio cards 90 and 92. The mono output is provided to the mixer 64 in order to transmit the audio signals from the peripheral device 32 to the remote videoconference site 14.

Figure 9:
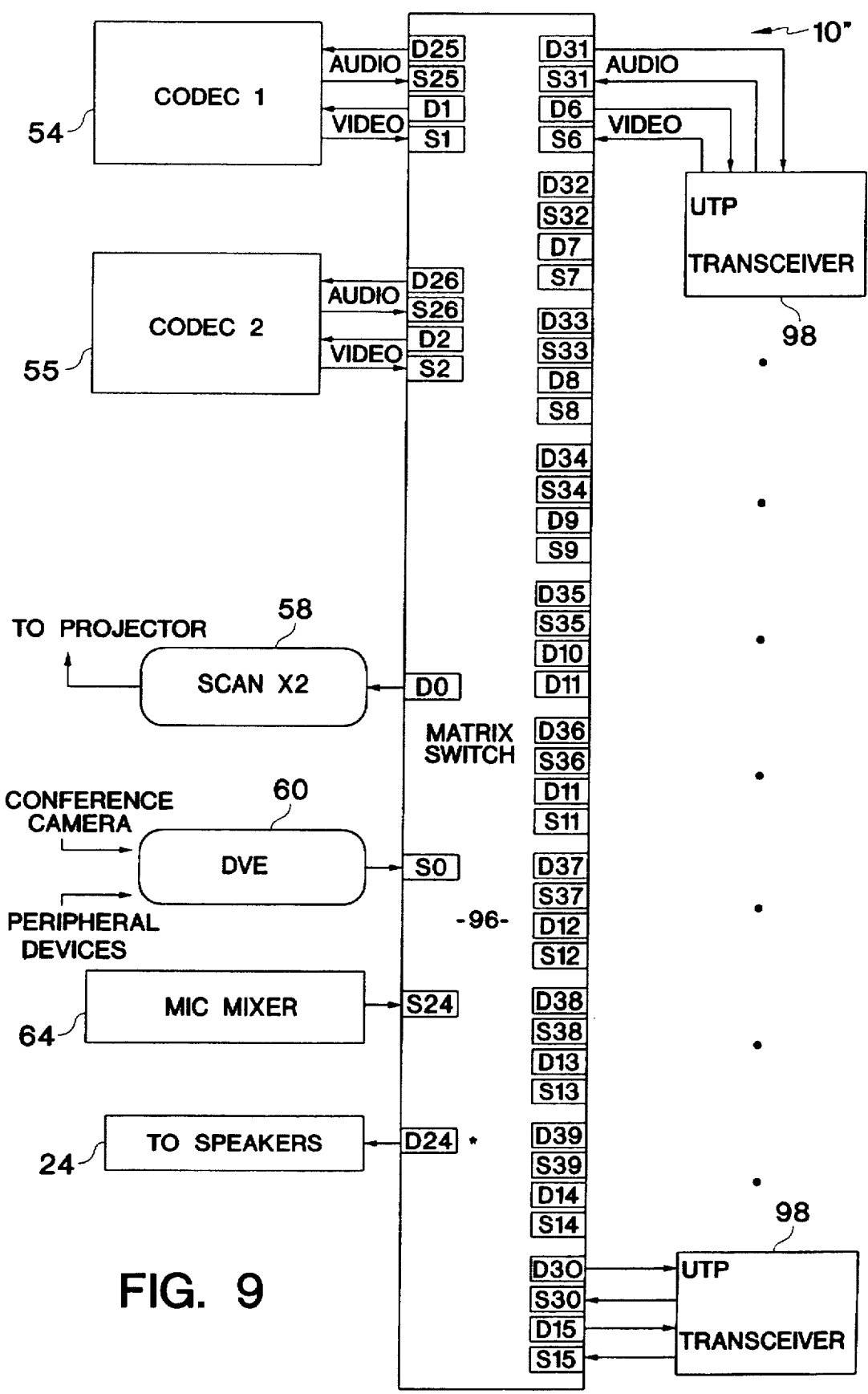
FIG. 9 is a schematic block diagram of a videoconferencing system for pooling CODECs for a number of local videoconference sites in accordance with the present invention.

In accordance with another embodiment of the invention, a matrix switch can be used to switch the audio and video data from several videoconference sites using a smaller number of pooled CODECs, as shown in FIG. 9. FIG. 9 depicts a matrix switch 96 which accommodates as many as 10 unshielded twisted pair (UTP) transceivers 98 available from Network Video Technology, Palo Alto, Calif. and switches the audio and video data between two or more of these UTP transceivers 98. The matrix switch 96 can use either one of the two CODECs 54 and 55 for transmitting audio and video data to a remote videoconference site and receiving audio and video data therefrom. The number of UTP tranceivers and CODECs shown in FIG. 9 are for illustrative purposes. Different numbers of UTP transceivers and CODECs can be used in accordance with the invention. The matrix switch is essentially a video and audio gateway for easy access and modular expandability to support multipoint videoconferences involving three or more conferees or multiple simultaneous videoconferences. Further, the matrix switch enables several conference rooms to be configured for videoconferencing without having to provide expensive communication and encoding equipment such as a CODEC in each of these rooms. Thus, this embodiment of the invention realizes cost savings.

Figure 10:
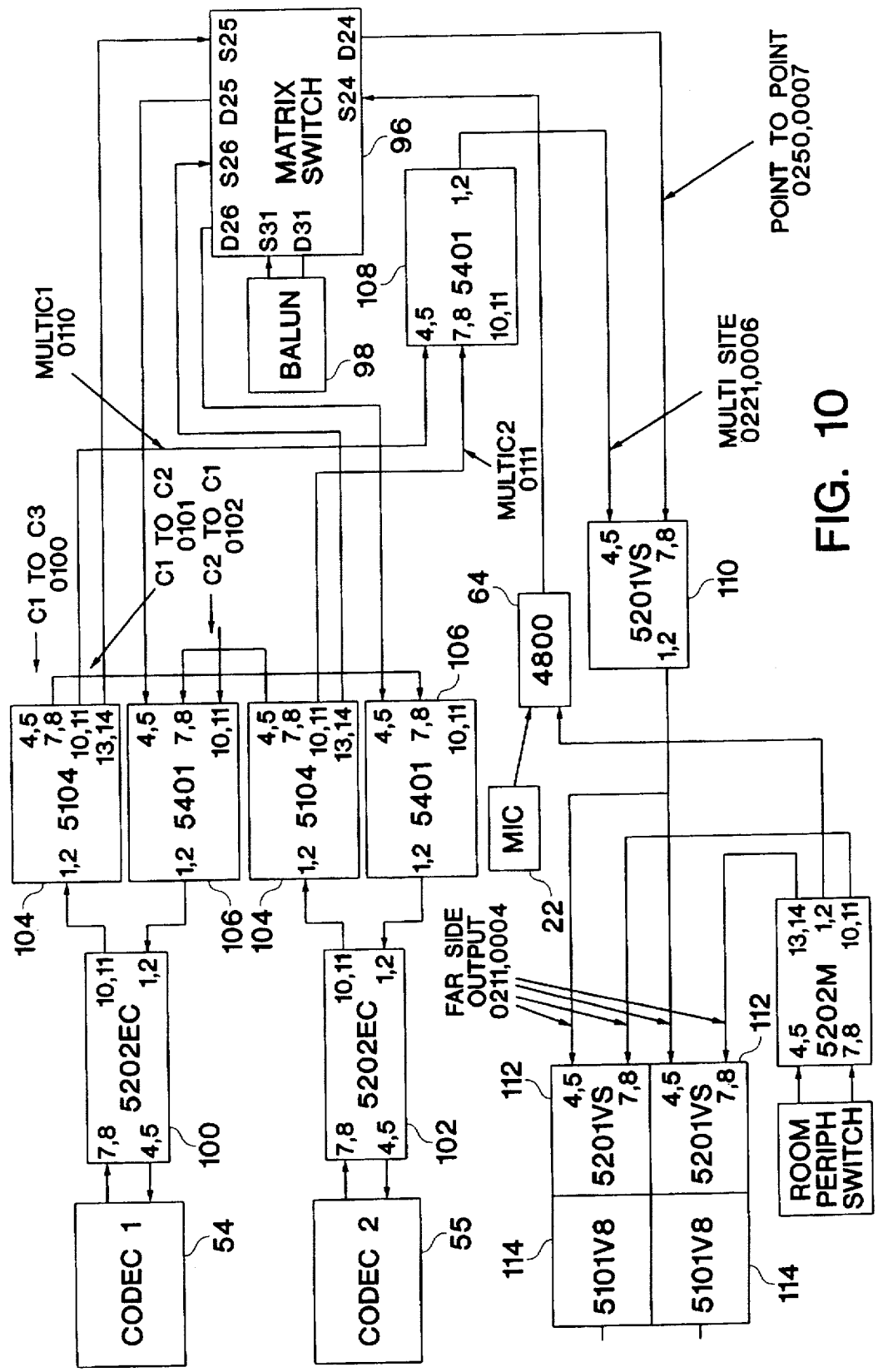
FIG. 10 is a schematic block diagram of an audio bridging circuit for the videoconferencing system depicted in FIG. 8.

The audio system of the videoconferencing system 10" depicted in FIG. 9 is shown in FIG. 10. The CODECs 54 and 55 are each connected to audio echo cancellation cards 100 and 102, respectively. The cards 100 and 102 are each connected to two audio cards 104 and 106 for distributing one input to four outputs and mixing four inputs to one output, respectively. The outputs from the one-to-four distribution cards 104 are provided to another four-by-one mixing card 108 which, in turn, is provided to an audio switching card 110. The audio switching card 110 receives input signals from the matrix switch 96 as well. The output of the audio switching card 110 is provided to the left and right speakers 24 via, for example, a combination of mixing and amplification cards 112 and 114. Several switching points are provided via relays under PLC control in order to facilitate multi-point versus point-to-point videoconferencing, e.g., inputs 4,5 and 7,8 to the card 108 and 4,5 and 7,8 to the card 110. Microphone signals to the audio mixer 64 are processed and then provided to each of the CODECs via the matrix switch 96 and a selected four-to-one mixing card 106. Outputs from the one-to-four distribution cards 104 are provided to the matrix switch 96 and to the four-to-one mixing card 106 of the other CODEC. The audio system in FIG. 10 therefore bridges audio signals for multiconference environments involving three or more participant systems.

Management System

The management system preferably comprises an IBM-compatible personal computer 70 having a hard disk drive, a Super VGA board, an EtherNet high performance AE-200 LC board, and a PT-606 super IDE I\O card. The PC is also connected to a PLC controller 68. As stated previously, the PC preferably operates on a Microsoft Windows NT operating system and is therefore capable of accessing information and resources across multi-vendor environments, integrating electronic mail and networking services, and pre-emptive multi-tasking. The 32-bit multi-tasking, native-networking operating system allows the system 10 or 10' to integrate applications programs (e.g., word processing and presentation software) and perform distributed control, as well as file sharing and data transfers. The VGA board provides a TrueColor VGA graphic user interface (GUI) accelerator, a Bit Block Transfer (BitBLT) for GUI acceleration, integrated random access memory and digital-to-analog conversion (RAMDAC) with a 256 color palate and extensive graphic road support. The EtherNet board is a network controller board that implements EtherNet standards and works with a number of commercial software programs. The IDE I/O card is a 16 bit card for connecting the PC with other internal and external devices. It provides two serial ports, a parallel port, a game port, a floppy disk driver and an IDE hard disk controller. The PLC miniature controller 68 has an open architecture expansion bus for accommodating add-on boards. It also comprises two RS-232 serial ports for communicating with the management system, that is, the PC. The PLC controller provides eight optically isolated input channels, eight relay driver output channels, and two half-duplex RS-485 serial communications ports. The PC also comprises a PC/16e intelligent asynchronous communications board for a personal computer serial communications.

In accordance with an embodiment of the present invention, a parallel data path is provided to route TCP\IP between remote and local videoconference sites. The management system software displays high resolution still-video frames of video clips. The images from any source can be captured, edited, compressed and transferred to another videoconferencing site. Once received at these sites, the images can be decompressed and displayed as thumbnails. They can also be displayed on a full screen at the original resolution. Thus, the management system allows software driven image compression and decompression, viewing, file format conversion and other image processing functions. Images can be flipped, rotated, reversed, resized, lightened or darkened, and decompressed to different locations on the screen. The EtherNet board facilitates the transfer of data to a videoconference site outside the bandwidth of the video conference, thereby enhancing data transfer. The EtherNet board is also useful for running applications programs, and remote diagnostics.

The management system of the videoconferencing system 10 and 10' employs both layering and an object oriented-like model. The layer design approach permits the functionality of the system to be divided into different layers such that each individual layer can be designed and developed independently of other layers. An interface is defined for operating between each of the layers. As stated previously, the object oriented-like programming used to create the management system is useful for controlling many different types of devices. For example, each device generally has a set of routines that control that device. These routines make up the object for that device. Thus, the use of objects makes the management system modular and therefore to be easily maintained and updated. The management system uses multi-processing and multi-threading to increase the flexibility and efficiency with which new devices and standards are implemented the system 10 and 10'.

The layers of the system will be described with reference to FIG. 4. The first layer is the Interface layer, which provides users or conferees with a user-friendly front end input and display device that can be used to manipulate the many complex devices within the videoconferencing system of the present invention. Layer 2, the Routing layer, is for information gathering and routing and represents the main engine of the management system, as it acts as both a router to the rest of the management system and as an interpreter of commands. The third layer for Group Control receives input from layer 2 and provides control for many different types of devices in the management system. It is useful for determining how changing one device affects other devices in the system and makes decisions accordingly and routes information to appropriate device types. The fourth layer is for Device Control. It receives input from both layers 2 and 3 and allows device communication directly to any of the three remaining layers 5, 6, and 7 in the system. Layer 5 is for Device Control. Layer 5 receives input from the fourth layer for device objects. Device control for audio, mechanical positioning and infrared are included in layer 5. Layer 6 for device communication is designed to receive input from layer 5 and to manipulate voltage control devices, accordingly. The command string received in layer 6 determines the manner in which a particular device is affected. Layer 7 is the System layer which communicates with the operating subsystem. Layer 7 receives input from layers 6, 5 and 4.

With continued reference to FIG. 4, the objects of the management system will now be described. Layer 1 comprises a single interface object 120 for operating, for example, the touch screen 26. The interface object 120 receives requests from a user and calls the appropriate functions to process them. Layer 2 comprises a communications manager object 122 and a network manager object 124. The communications manager object insures that requests are transmitted to the appropriate device or group control manager. The communications manager object can receive requests from the interface object 120 or the network manager object 124 or any other object added to layer 2. The requests are then routed to the appropriate device or group control manager. The network manager object in layer 2 controls remote communication from the management system by passing commands from one remote videoconference site to another, enabling each site to be able to control the other site. The network manager object 124 also passes commands to the communications manager object 122, which in turn interprets the commands and changes the local videoconferencing system accordingly. The object therefor creates both a client and a server at each site to communicate between themselves. The network manager object is accessed by the interface object and by its own client function.

Layer 3 objects preferably include an audio manager object 126, a control manager object 120 and an infrared manager object 130. The audio manager object manages the audio for the entire system 10 or 10'. The audio manager object routes requests to the appropriate device at layer 4, as well as makes decisions on the effects of the requests it receives, as does the communications manager object 122. For example, a request to change the audio level of one device affects the entire audio system in general. The audio manager object 126 determines how to manage this effect. The audio manager object is accessed by the communications manager object.

The control manager object 128 manages the mechanical positioning events of the videoconferencing system 10 or 10', such as moving the conference camera, panning and tilting auditorium cameras, or zooming a graphics camera. Requests for mechanical positioning events are routed to layer 4. Since a request to change the mechanical position of one device can effect the entire controlling system in general, the control manager object 128 determines how to manage the effect. The control manager object 128 is accessed by the communications manager object 122.

The infrared manager object 130 manages all devices which can be communicated with by means of an infrared device. As with the audio and control manager objects, the infrared manager object routes requests to the appropriate device at layer 4 and makes decisions about the effects of requests it receives. It too is accessed by the communications manager object 122.

The layer 4 objects are CD-I, CODEC, DVE, YEM, VCR, CPM, CSU, Ascend, Audio System, Conference Camera, Graphics Camera, and RS449 Switch objects. The CD-I object 132 controls a CD-I device. It emulates the control module of a compact disc interactive (CD-I) player. These functions include being able to perform audio changes and interpret infrared commands such as play, stop and fast forward. It is flexible to handle a dynamic number of CD-I devices. The CD-I object is accessed by the audio manager object and the infrared manager.

The CODEC object 134 controls the CODEC 54. The CODEC object operates to initialize and set up the CODEC. It performs functions for the audio mute, image window, clock rate and data rate. The CODEC is the main communications device for the system. The CODEC object is accessed by the communications manager object 122.

The DVE 136 object controls and maintains the DVE module 60. It performs functions related to video source manipulation such as transitioning from an old source to a new source, switching channels, resizing a video source and keying it over another video source (PIP functions). The DVE object is accessed by the communications manager object.

The YEM object 138 controls and maintains the EDC 38, which is a line doubler. The YEM object is accessed from the communications manager object.

The VCR object 140 controls the VCR device and emulates control functions of a VCR. These functions include being able to perform audio changes and interpret infrared commands such as play, stop and fast forward. It is flexible to control a dynamic number of VCR devices. The VCR object is accessed by the audio manager object 126 and the infrared manager object 130.

The CPM object controls the projection system. This object is responsible for emulating the control module of the projector. It provides easy access to the projector through the system, thereby simplifying tasks such as auto convergence. The CPM object is accessed by the communications manager.

The Conference Camera object 144 controls the main conference camera 16. This object is responsible for managing the camera functions such as tint, color, white and black balancing. The conference camera object is accessed by the communications manager.

The IMUX object 148 controls the Ascend IMUX 52. It is responsible for performing ISDN connections between videoconferencing systems. This object uses the Ascend MIF to send commands to the Ascend. The commands include changing the number to call and changing the base channel count, which controls the data rate at which to connect. The IMUX object is accessed by the communications manager.

The audio system object 154 controls the main audio for the video conference. This includes all microphone levels, as well as speaker levels. This object is flexible to control a dynamic number of devices, and configured to know how to control them. The audio system object is accessed by the audio manager object 126.

The RS449 switch object 152 controls the two-way RS449 switch. This object allows the user to choose between two RS449 inputs to the system for remote transmission. The RS449 switch object is accessed by the communications manager object.

The layer 5 objects are: audio, controller, and infrared. The audio object 156 controls the audio for all the device objects that require it. This object sets the audio commands in a format that the PLC object 162 can understand. It is flexible to process any type of device that needs audio control. The audio object is accessed by any layer 4 device object that requires audio services.

The control object 158 controls the mechanical positioning for all the device objects that require it. This object sets positioning commands in a format that the PLC object can understand. It is flexible to handle any type of device that requires mechanical positioning control. The control object is accessed by any layer 4 device object that require mechanical positioning services.

The infrared object 160 controls infrared commands for all device objects that require it. It takes the command string and sends it to the serial communication object 164 to communicate with the devices. It is flexible to control any type of device that needs infrared control. The infrared object is accessed by any layer 4 device object that requires infrared services.

The layer 6 object is the PLC object 162. The PLC object controls the programmable logic controller 68. The PLC interacts with any device that can be controlled by it. It electronically changes voltage inputs and outputs in order to manipulate a device. The audio object 156 uses this device to change device audio. It manipulates a variety of devices and therefor is flexible. The PLC object is accessed by the audio object and the controller object.

The layer 7 objects are the serial communication object 164 and the message log object 166. The serial communication object controls actual communication from the systems 10 or 10' to all devices. This object accesses the operating system kernel to communicate to the computer's serial ports. It passes the commands needed to change each device to the specific device. The serial communication object is accessed by the CODEC object 134, the DVE object 136, the Ascend object, the YEM object 138, the CPM object 142, the Infrared object 160, and the PLC object 162.

The message log object 166 controls the error messages returned from failed calls. It receives an error message number from any failed call and stores it to a file which is processed by an error handler object. All other objects preferably make use of this object. The message log object is accessed by the serial communication object.

User Interface

Figure 11:
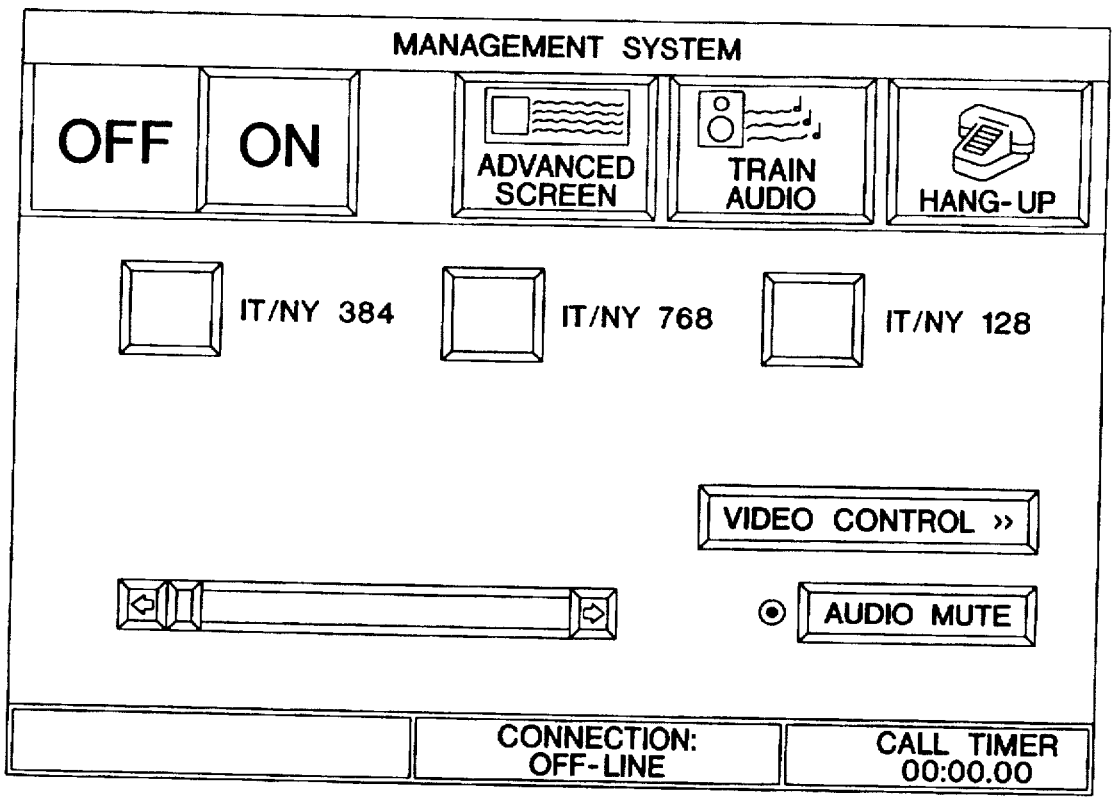
FIGS. 11 through 17 are screens generated for a graphic user interface for a videoconferencing system in accordance with an embodiment of the present invention.

System 10 (FIG. 2) and 10' (FIG. 3) can be controlled by the user using the touch screen 26 and the PC 70. The PC is programmed to generate a number of screens which are displayed on the touch screen and which provide the user with various buttons for configuring the system for a videoconference. The screen depicted in FIG. 11 is the initial screen when the system 10 or 10' is off. By touching the ON button, the PC 70 generates the screen depicted in FIG. 12. The user can use this screen to adjust the volume, to display the video control screen (FIG. 13), or to initiate a video conference by depressing one of the three dial buttons. The user can subsequently disconnect the connection by depressing the HANG-UP button at the top of the screen.

Figure 12:
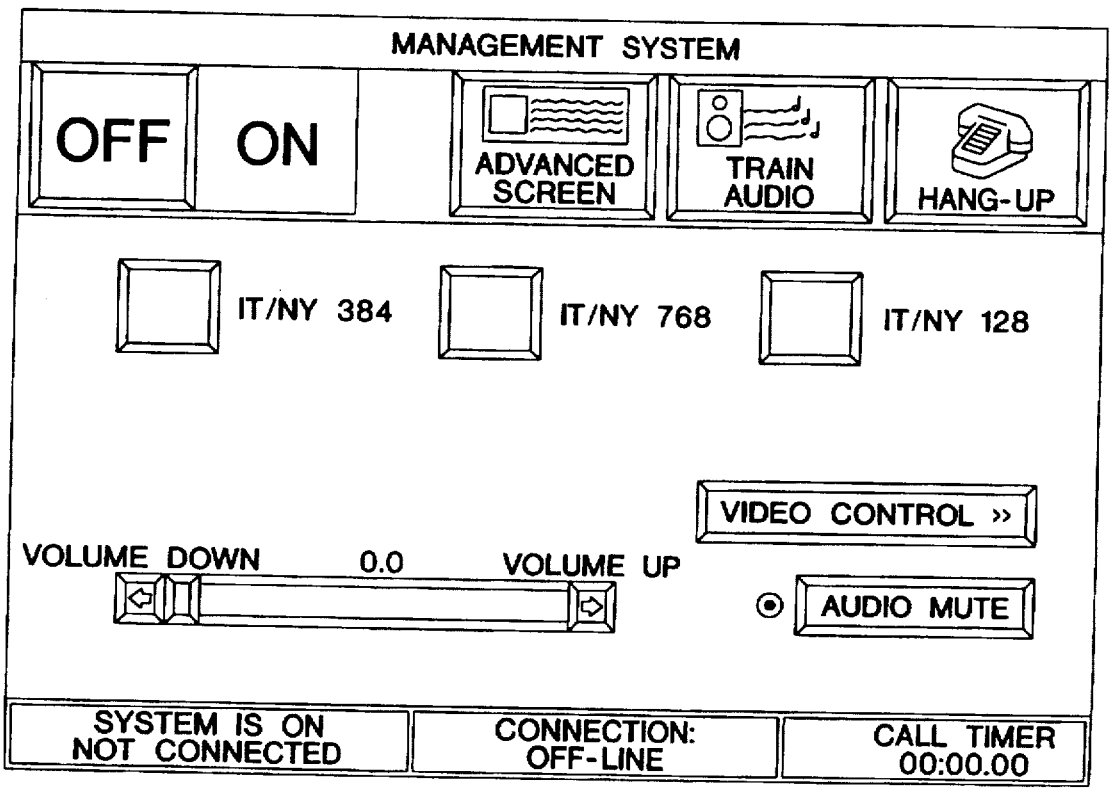
Figure 13:
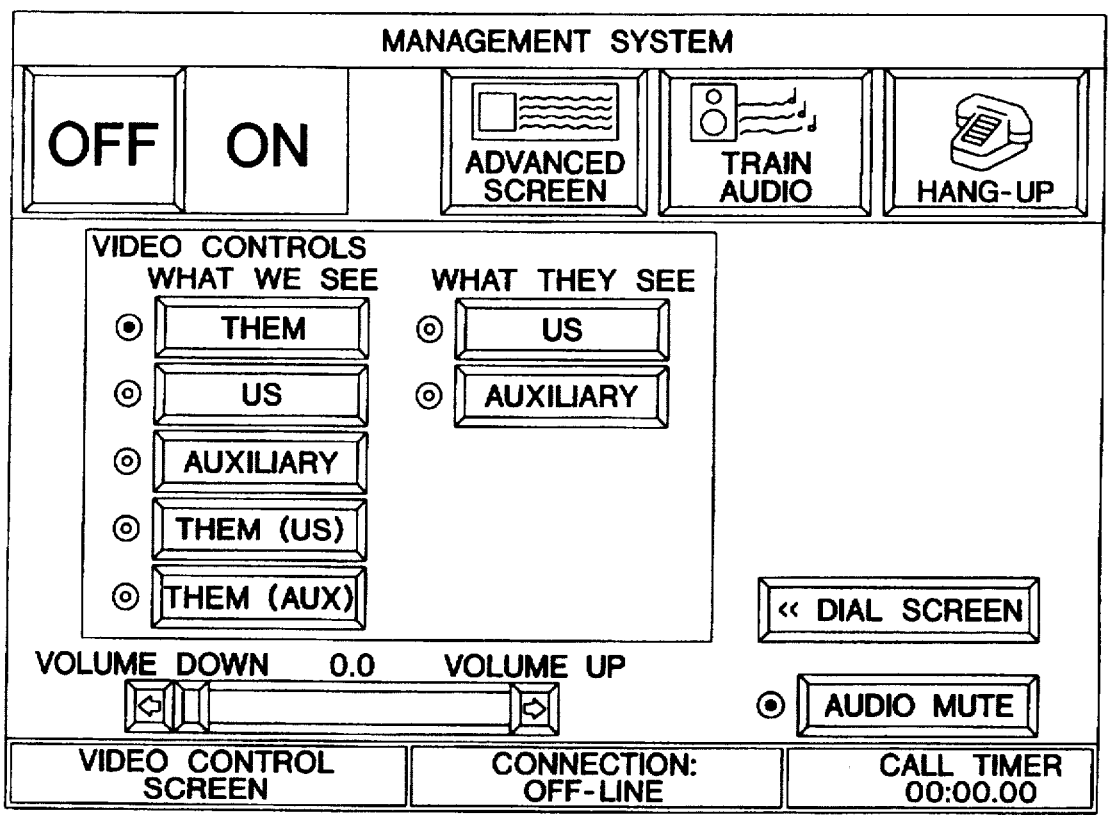

If the VIDEO CONTROLS button is depressed in FIG. 12, the screen in FIG. 13 is generated. The user can choose to see the remote videoconference sites, the local videoconference site, an image from an auxiliary video source, the remote videoconference site with a PIP of the local videoconference site, or a PIP of the auxiliary video source. In addition, the user can select to see what has been transmitted, that is, the image generated by the camera at the local videoconference site or the auxiliary video source, and therefore what is being viewed by the remote videoconference site viewers. The user can touch the DIAL SCREEN button to return the screen depicted in FIG. 12. The auxiliary video source can be a graphics camera, a VCR or other device.

With continued reference to FIG. 13, the user can select the ADVANCE SCREENS button at the top of the video systems screen. The computer in turn generates the screen depicted in FIG. 14. The Advanced System Control screen provides the user with the options to select from among Camera Control, Communications Options, and Projector Control Screens and to return to the Dial Screen in FIG. 12. The Camera Control screen (FIG. 15) allows the user to adjust the white and black balance, as well as to return to the screen depicted in FIG. 14.

Figure 14:
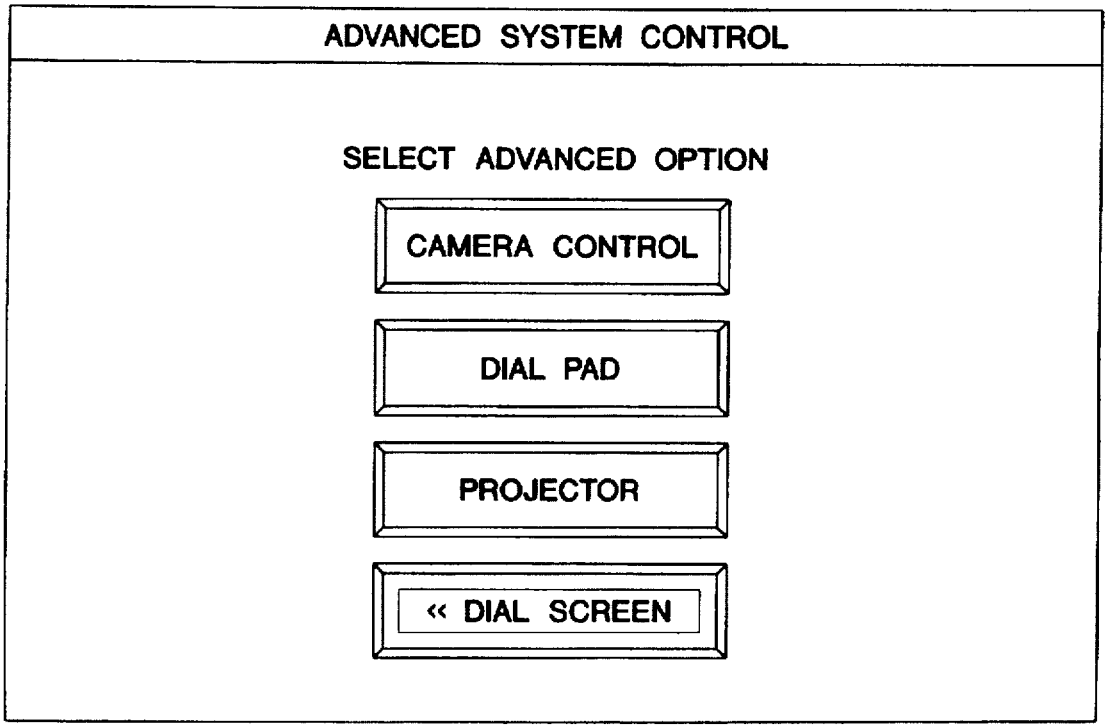
Figure 15:
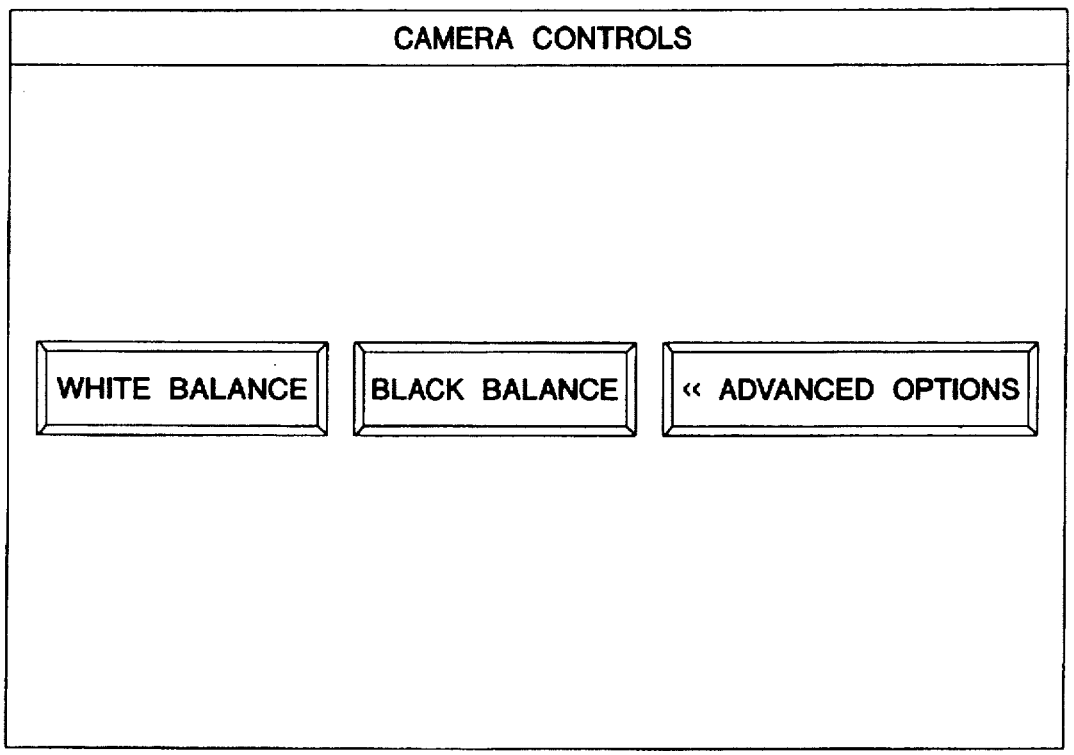
Figure 16:
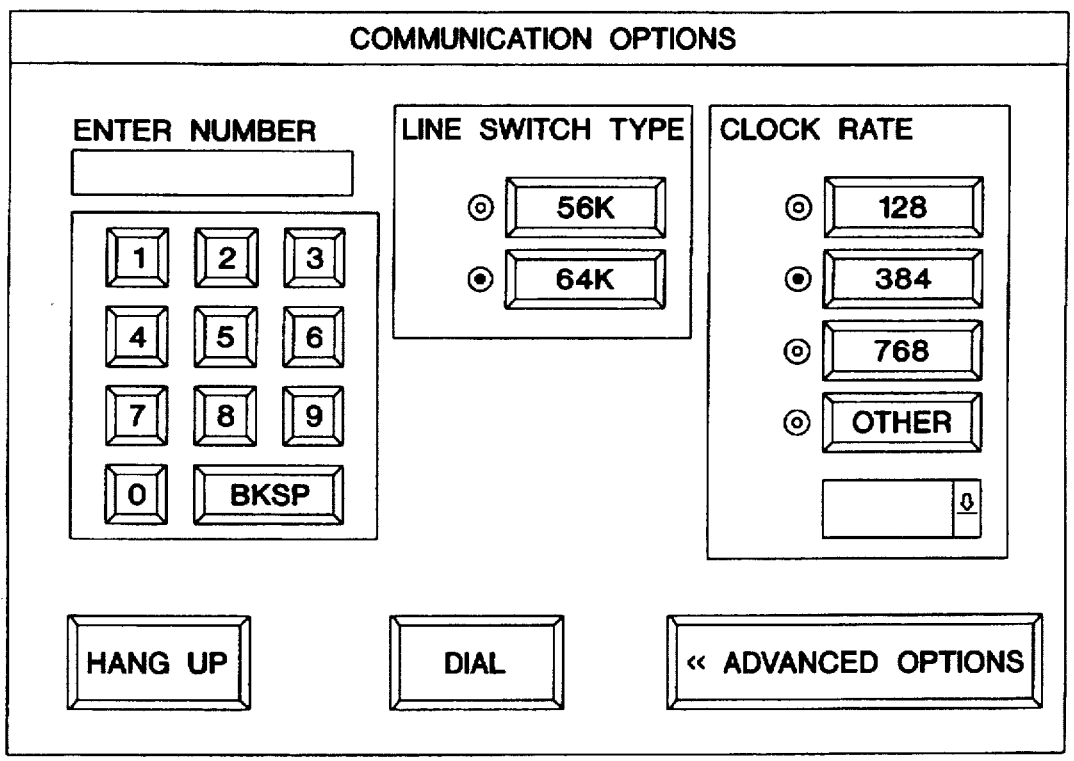

By selecting the Dial Pad button in FIG. 14, the PC generates the Communications Options screen depicted in FIG. 16. With reference to FIG. 16, the Communications Options screen permits the user to manually dial conference sites that have not been preset. In addition, the user can enter line switch type and clock rate. Once the number has been entered, the DIAL button can be depressed to initiate a connection.

Figure 17:
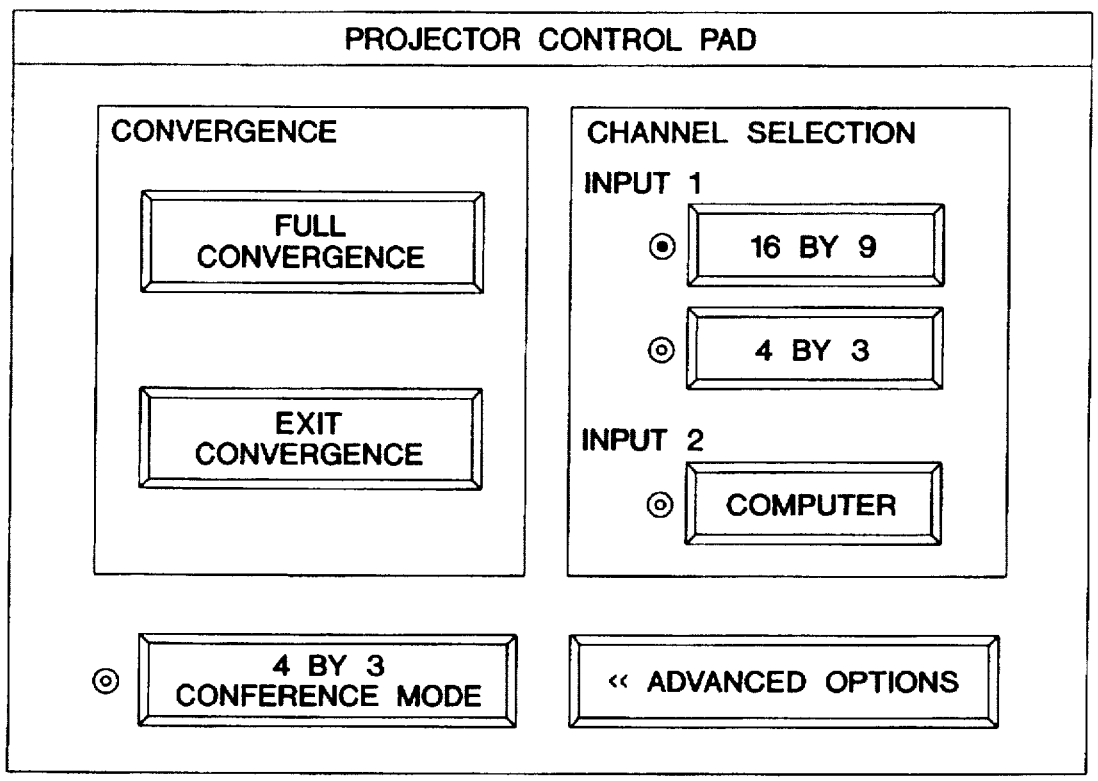

The Projector Control screen, shown in FIG. 17, permits the user to adjust the convergence and the aspect ratio or channel. By depressing the full convergence button, the motors of the convergence unit are set into motion and continue to automatically adjust themselves until the convergence process is complete, or the user selects the Exit Convergence button. In addition, the user can select an aspect ratio of 16×9 or 4×3.

Figure 18:
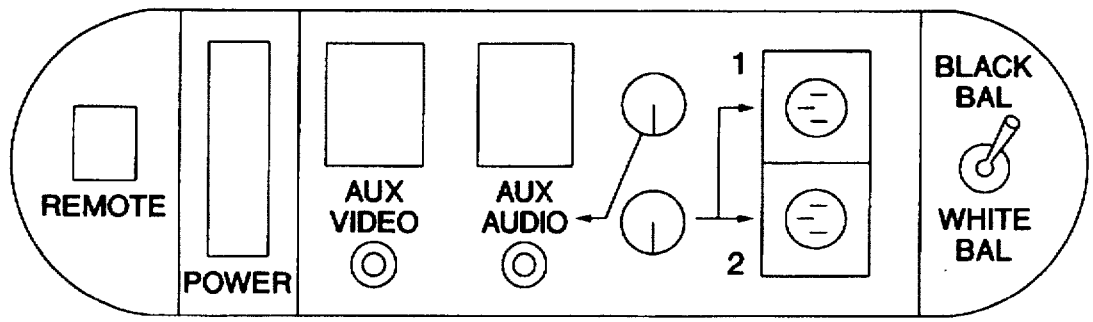
FIG. 18 is a front view of a control panel for the videoconferencing system depicted in FIG. 3 in accordance with an embodiment of the present invention.

The system 10' (FIG. 3) can be controlled by the touch screen through the PC 70, or by a combination of a palmtop controller for dialing available from Ascend Communications, a hand-held remote control for the monitor 44 functions (e.g., PIP, full screen preview, volume control and aspect ratio switching) and a control panel located, for example, on the side of the portable cabinet enclosing the system 10'. The monitor remote control comprises a TV button and an ON/OFF button for turning the monitor on and off, volume buttons for controlling the volume level of the monitor, a MUTE button for turning the monitor sound on and off, a CINEMA button for displaying a cinema control menu (e.g., to select image size such as full image at a 16×9 aspect ratio and a normal image at a 4×3 aspect ratio), and a CLEAR button to clear the monitor screen of menus. The control panel is depicted in FIG. 18. The control panel has a power switch for turning the system on and off, an auxiliary video button for switching the video input between the conference camera and an auxiliary video source, an auxiliary video port through which an auxiliary video source such as a VCR or graphics camera, for example, can be connected, first and second ports for connecting microphones and a control knob for controlling microphone input level, and a black and white balance switch for adjusting the conference cameras color settings.

If the CINEMA button on the hand-held remote control is depressed twice, the monitor displays a Cinema Control menu screen which prompts the user to select one of two aspect ratios in accordance with the system with which the user is conferencing. An aspect ratio can be selected by depressing a specified numeric key on the remote control. By depressing another number on the hand-held remote control, the user can exit the Cinema Control menu. The remote control also comprises an input button which can be used to display an Input Control menu on the monitor. The Input Control menu gives the user the option of previewing the local videoconference site image as displayed on the monitor. Thus, the user can ensure that the camera is set properly and that every conferee is in full view of the camera. The user can hold a blank sheet of white paper directly in front of and approximately three feet away from the camera to adjust the white balance. The user can then cover the camera with a dark lens cap to perform black balance. Both of these balance functions are accomplished using the black and white balance switch on the control panel. A red indicator on the control panel flashes for several seconds and then stops flashing when the setting is balanced.

To set the video input for videoconferencing, the Input button on the hand held remote control is depressed and the Input Control menu screen is displayed again. A numeric key can be depressed to select video 1. The terminal remote unit can then be used initiate communications with the remote conferencing site as described above. Once a videoconference has been established, the user can adjust audio levels, that is, the microphone output level using the volume button on the hand-held remote control and the ports 1 and 2 control knob on the control panel, respectively.

While certain advantageous embodiments have been chosen to illustrate the invention, it will be understood by those skilled in the art that various changes and modifications can be made herein without departing from the scope of the invention as defined in the appended claims.

What is claimed is:

1. An audio bridging circuit for a videoconferencing system which establishes videoconferences between at least one local videoconference site and a plurality of remote videoconference sites, comprising:

first and second coder and decoder units for receiving audio signals from respective ones of said plurality of remote videoconference sites;

two first audio distribution devices connected, respectively, to said first and second coder and decoder units, said first audio distribution devices being operable to provide one of a plurality of inputs thereof to an output connected to a corresponding one of said first and second coder and encoder units;

two second audio distribution devices connected, respectively, to said first and second coder and decoder units for providing an input from a corresponding one of said first and second coder and decoder units to one of a plurality of outputs thereof, said output of said second audio distribution device connected to said first coder and decoder unit being connected to one of said inputs of said first audio distribution device connected to said second coder and decoder unit, and said output of said second audio distribution device connected to said second coder and decoder unit being connected to one of said inputs of said first audio distribution device connected to said first coder and decoder unit; and a matrix circuit for providing audio signals from said local videoconference site to one of said inputs of each of said first audio distribution devices.

2. An audio bridging system for a videoconferencing system which establishes videoconferences between first and second videoconference sites, comprising:
- a first coder and decoder unit connected to said second videoconference site for receiving audio signals therefrom;
- a first audio distribution device connected to said first coder and decoder unit and operable to provide one of a plurality of inputs thereof to an output connected to said first coder and decoder unit;
- a second audio distribution device connected to said first coder and decoder unit and operable to provide an input from said first coder and decoder unit to one of a plurality of outputs thereof;
- a matrix switch having a first output connected to an input of said first audio distribution device and a first input connected to an output of said second audio distribution device; and
- a microphone mixer unit connected to said matrix circuit and to at least one microphone at said first videoconference site.

3. An audio bridging system for a videoconferencing system as claimed in claim 2, further comprising:
- a second coder and decoder unit;
- a third audio distribution device connected to said second coder and decoder unit and operable to provide one of a plurality of inputs thereof to an output connected to said second coder and decoder unit; and
- a fourth audio distribution device connected to said second coder and decoder unit for providing an input from said second coder and decoder unit to one of a plurality of outputs thereof, said output of said second audio distribution device being connected to one of said inputs of said third audio distribution device, and said output of said fourth audio distribution device being connected to one of said inputs of said first audio distribution device, said matrix switch having a second output connected to an input of said third audio distribution device and a second input connected to an output of said fourth audio distribution device.

4. An audio bridging system for a videoconferencing system as claimed in claim 3, further comprising:
- at least one speaker; and
- switching means connected to said second and fourth audio switching devices for providing output signals therefrom to said speaker.

* * * * *